United States Patent [19]

Harris

[11] Patent Number: 4,463,845
[45] Date of Patent: Aug. 7, 1984

[54] MATERIAL-HANDLING APPARATUS AND METHOD

[76] Inventor: Gerald R. Harris, P.O. Box 1148, Pryor, Okla. 74361

[21] Appl. No.: 305,207

[22] Filed: Sep. 24, 1981

[51] Int. Cl.³ .................... B65G 43/08; B65G 43/10; B65G 47/22
[52] U.S. Cl. .................................. 198/341; 198/345; 198/617
[58] Field of Search ...................... 198/341, 345, 617; 83/206, 277

[56] References Cited

U.S. PATENT DOCUMENTS

| | | | |
|---|---|---|---|
| 3,113,767 | 12/1963 | Halberstadt | 198/345 X |
| 3,155,242 | 11/1964 | Magloire | 198/345 X |
| 3,504,585 | 4/1970 | Harris | 83/277 X |
| 3,696,756 | 10/1972 | Elmore et al. | 198/345 X |
| 3,841,462 | 10/1974 | Schmidt | 198/345 |
| 4,048,833 | 9/1977 | Lorenz | 83/277 X |

FOREIGN PATENT DOCUMENTS 894022  4/1962  United Kingdom ................ 198/341

Primary Examiner—James L. Rowland
Attorney, Agent, or Firm—Manfred M. Warren; Robert B. Chickering; Glen R. Grunewald

[57] ABSTRACT

A material-handling apparatus and method are disclosed for use in high-speed feeding of bar stock or the like to a precise registered position with respect to a machine tool. The apparatus includes a stop which senses the position of the material and is coupled to a controller for a high-speed conveyor. The stop causes disengagement of the high speed conveyor in advance of the registered position and simultaneously causes an inching device, such as a movable vise, to move into gripping engagement with the work piece. The inching vise brakes the speed or advancement of the stock to an inching speed, and when the stop senses advancement of the work piece to the registered position at the inching speed, the inching vise advancement is terminated. Reversing of the inching vise upon an overshoot is also provided.

16 Claims, 6 Drawing Figures

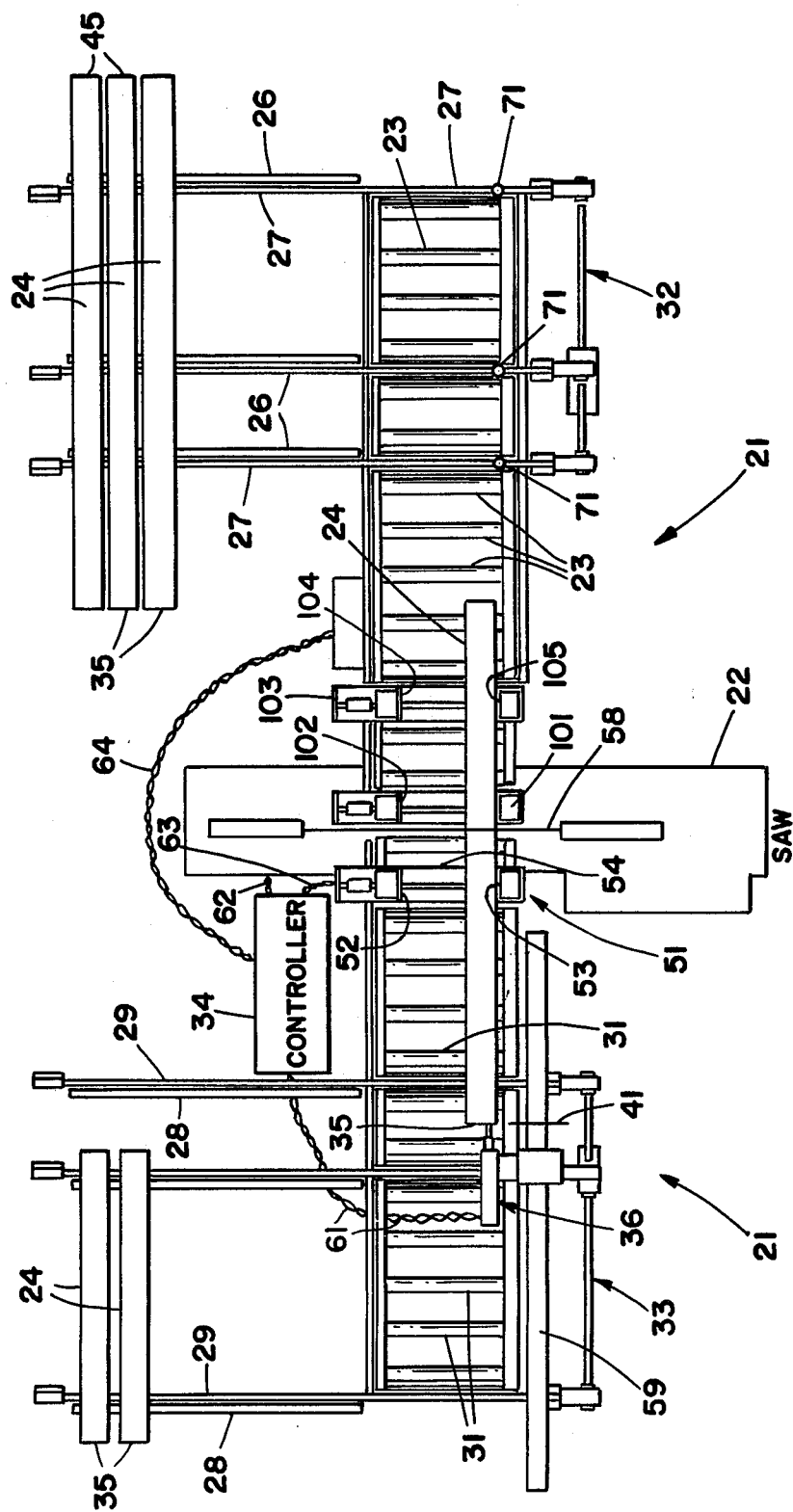
FIG_1

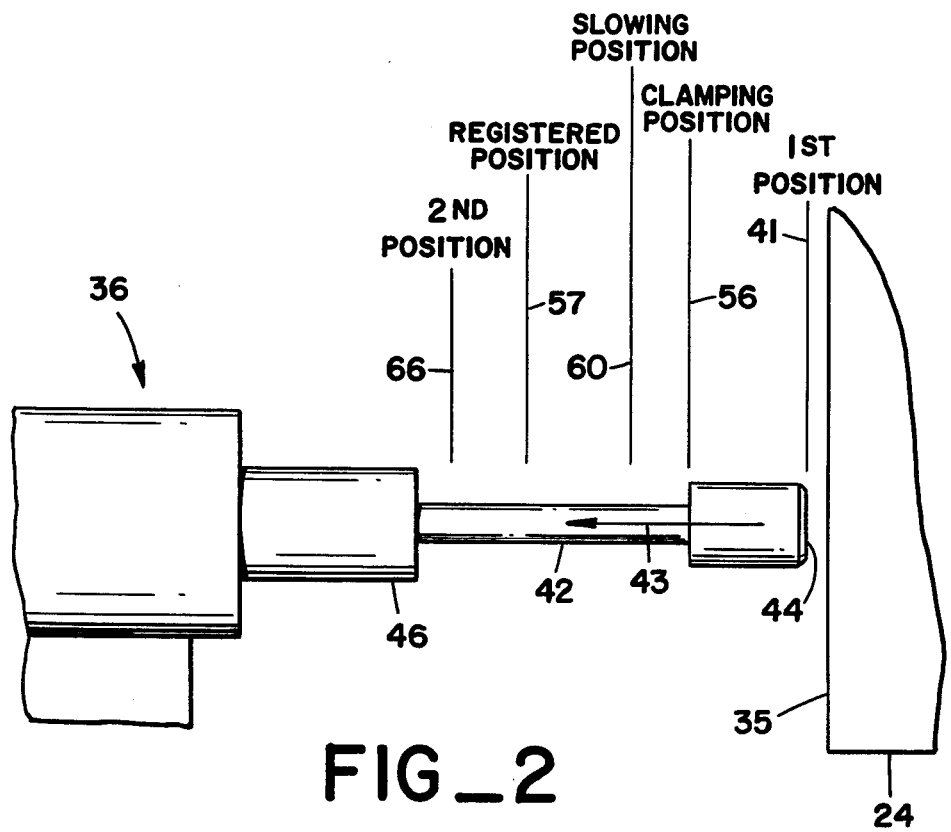
FIG_2
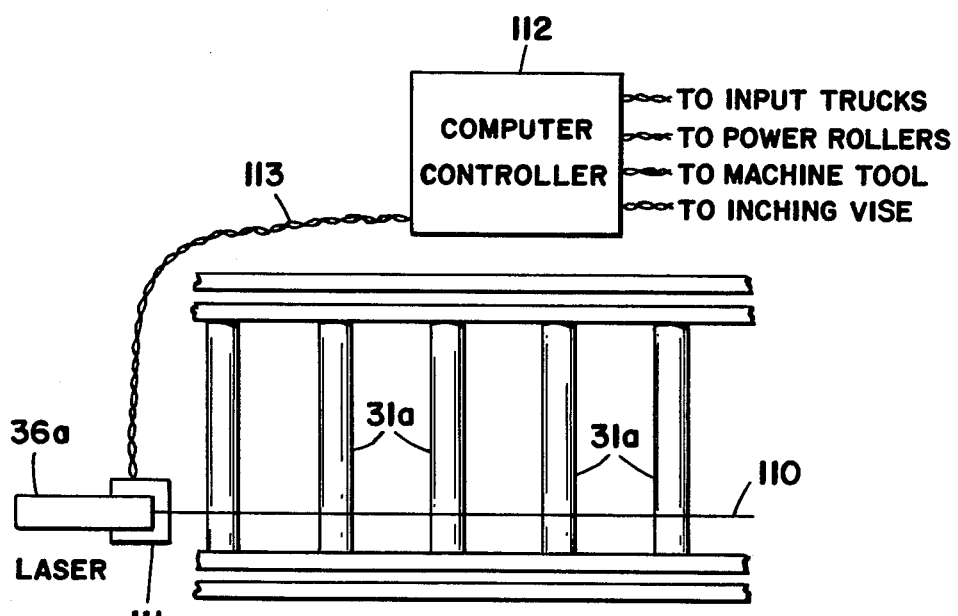
FIG_3

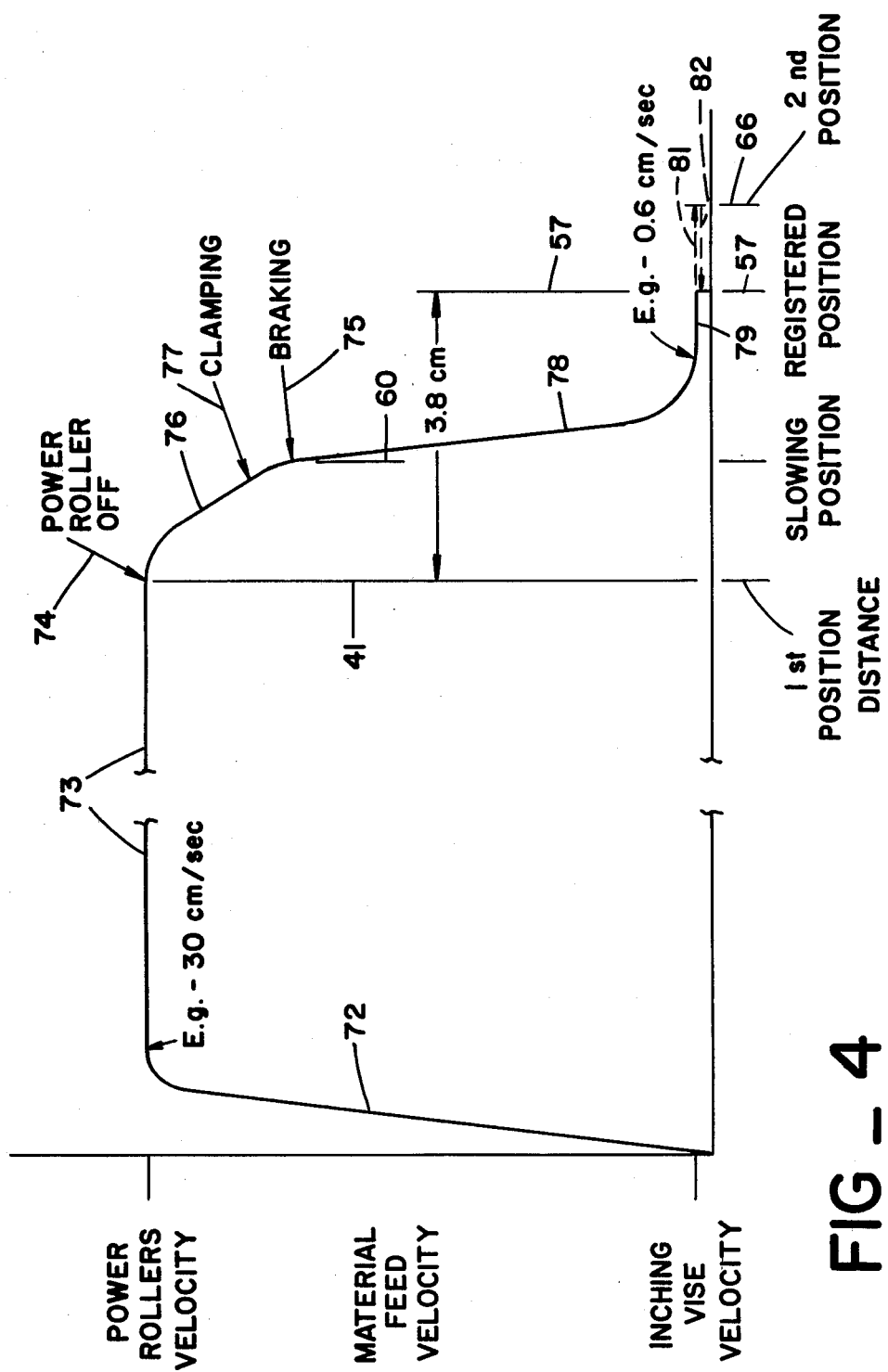
FIG—4

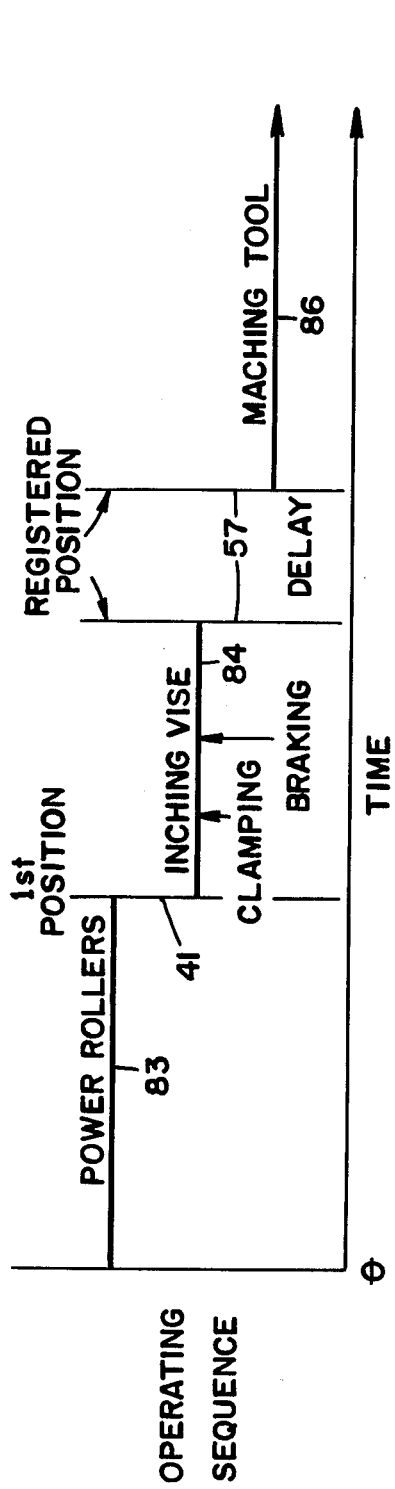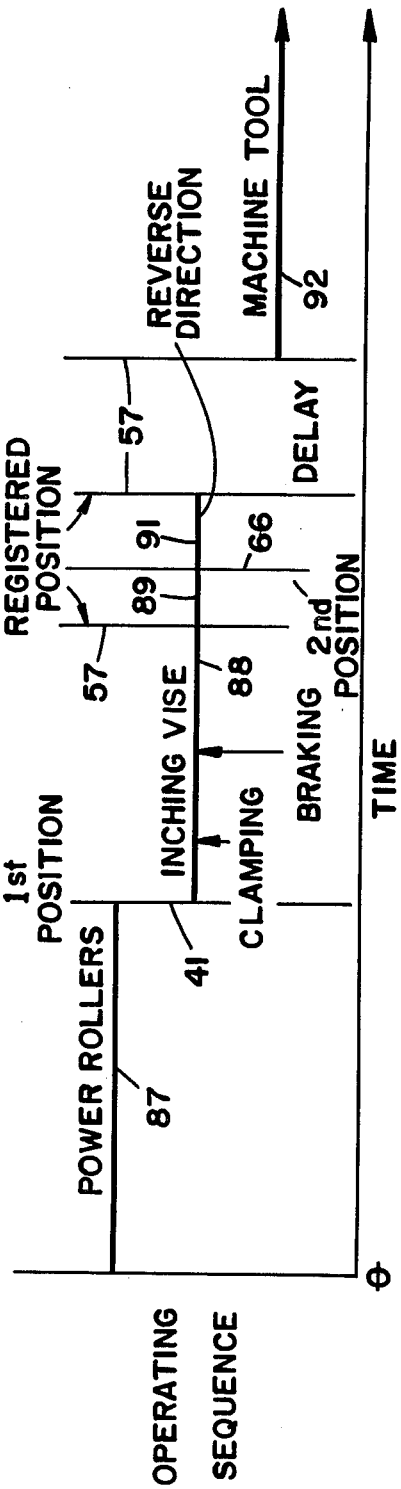

MATERIAL-HANDLING APPARATUS AND METHOD

BACKGROUND OF THE INVENTION

High production machine tools require material-handling systems which are capable of precisely feeding stock to the machine tool at a relatively high rate or else the production capacity of the machine tool is not fully utilized. A complete material-handling system should be capable of not only storing and conveying work pieces to the general area of the machine tool, but also positioning the work piece precisely and accurately in a registered or indexed position with respect to the machine tool for performance of a machining operation.

Prior production material-handling systems have been devised which are capable of delivering material to be processed at a relatively high rate to the machine tool, but registration of the work piece at the tool has lacked precision. The problem of positioning the work piece with respect to the machine tool is further exacerbated by the frequency with which the material or work pieces are irregularly formed. Crooked, bent or warped material, or pieces which have surface irregularities or burrs and ragged end cuts, will substantially influence the precision with which conventional material-handling apparatus will register a work piece in a machine tool for machining.

Typical of the prior art material-handling systems for machine tools are the power roller conveyors which are employed to feed bar stock to horizontal band saws. These systems employ chain or gear driven rollers which advance the bar stock toward the work area at between about 9.15 to about 18.3 meters per minute (30 to 60 feet per minute). The bar stock is usually advanced past the machine tool until it engages a stop. In some systems, the power rollers are slowed down prior to impact of the stop by the work piece, and they slip under the part and try to force the part against the stop.

While theoretically this approach will index the bar stock with respect to a machine tool, in practice, the registration of the bar with respect to the cutting tool is very poor. As will be appreciated, some bar stock will have considerable mass. Upon impact with virtually any stop, there will be deflection of the stop and/or rebound of the bar stock, and the mass of the stock will cause a variation in the amount of deflection. Additionally, the drive train for power rollers is inherently very loose and sloppy. It is virtually impossible, therefore, to accurately stop the power rollers, as they tend to coast and take out slack in the drive components. Moreover, the bar stock is not in any way positively secured to the power rollers, but merely rests on the same and is conveyed by means of friction and gravity.

The net result of conventional power roller material-handling systems has been that deflection of the stop, rebound of the material, slack in the power rollers and frictional sliding all contribute to relatively inaccurate placement of the bar stock with respect to the machine tool. Warpage, bending, cut-off spurs and the like exaggerate the inaccuracies.

Such prior material-handling systems can be tolerated in the industry for some applications in which machining accuracy is not critical. Alternatively, a production worker can be used to assist in the indexing of the stock so as to enhance the precision with which it is placed under the machine tool. Even the use of hand labor, in addition to its extra expense, may not be entirely satisfactory in achieving the precision which is desirable in the industry, namely, a variation of no more than about ±3.8 millimeters (0.015 inches) and preferably no more than about 0.635 millimeters (0.0025 inches).

OBJECTS OF THE INVENTION

Accordingly, it is an object of the present invention to provide a material-handling system and method which is capable of rapidly advancing material to and precisely registering the material at a machine tool for performance of a machining operation on the material.

It is another object of the present invention to provide a material-handling apparatus and method in which bar and plate stock, or the like, can be precisely registered with respect to a machine tool automatically and without the need for manual assistance.

Another object of the present invention to provide a material-handling apparatus and method which is suitable for use in high production applications in which the material must be positively registered with respect to a machine tool prior to performance of a machining operation thereon.

Still a further object of the present invention to provide a material-handling apparatus and method which is trouble-free in its operation, simple to construct, low in maintenance, durable, suitable for use with a wide variety of machine tools, adaptable to various installation configurations, and capable of being operated by relatively unskilled personnel.

The material-handling apparatus and method of the present invention have other objects and features of advantage which will become apparent from or are set forth in more detail in the accompanying drawing and following description of the preferred embodiment.

SUMMARY OF THE INVENTION

The material-handling apparatus of the present invention includes material conveyor means formed for support of material thereon and formed for powered advancement of the material at a relatively high speed toward a registered position with respect to a machine tool for performance of a machining step on the material. The apparatus also includes stop means formed and positioned to terminate advancement of the material at approximately the registered position. The improvement in the material-handling apparatus of the present invention is comprised, briefly, of the stop means being formed to sense the presence of the material at a first position proximate the desired registered position, and the stop means being further formed and coupled to the material conveyor to terminate powered advancement of the material conveyor upon sensing of the material at the first position. The improved handling apparatus further includes inching means formed to selectively engage, and preferably grip, and advance the material from a position proximate the first position to the registered position at a speed of advancement substantially less than the speed of advancement of the material conveyor. Finally the stop means is formed to sense the presence of the material at the registered position and to terminate advancement of the inching means upon such sensing. In a preferred form, power rollers are disengaged when the material is sensed at the first position and an inching means in the form of a vise positively grips the material on the fly, rapidly brakes the speed of advancement and slowly advances the material toward the registered position so as to permit accurate and precise stopping of the material in the registered position.

In the improved method of the present invention high-speed advancing of the material is terminated short of the registered position and a relatively low-speed advancing step is commenced, followed by termination of the low-speed advancing step when the material is precisely located a the desired registered position. Preferably the low-speed advancing step is accomplished by positively gripping the material to enable precision controlled stopping of the same.

DESCRIPTION OF THE DRAWINGS

FIG. 1 is a top plan view of a material-handling system constructed in accordance with the present invention and used to feed material to a horizontal band saw.

FIG. 2 is an enlarged, fragmentary, top plan view of the stop means or probe portion of the apparatus of FIG. 1.

FIG. 3 is an enlarged, fragmentary, top plan view of an alternative embodiment of the material-handling system of the present invention.

FIG. 4 is a graph of the velocity of material feed as a function of distance for the apparatus and method of the present invention.

FIG. 5 is a schematic representation of the operating sequence of the apparatus of FIG. 1.

FIG. 6 is another schematic representation of the operating sequence showing an over-shoot sequence.

DESCRIPTION OF THE PREFERRED EMBODIMENTS

As illustrated in the drawings, the material-handling apparatus of the present invention, generally designated 21, is shown as it may be employed to feed material to a horizontal band saw, schematically represented at 22. Typical of such horizontal, pivotal-arm band saws is the saw set forth in my U.S. Pat. No. 3,682,030, although it will be understood that the material-feeding apparatus and the method of the present invention are suitable for use with other machine tools.

Material-handling apparatus 21 includes conveyor means, such as in-feed rollers 23 and out-feed rollers 31, which are formed for powered advancement of material, such as bar stock pieces 24. In the handling system shown in FIG. 1, bar stock 24 is stored at holding stations or racks 26 and moved onto power rollers 23 by movable trucks 27, which are formed to lift the bars off of the racks and deposit them on the rollers. Such rack and truck apparatus are well known in the industry and will not be described in more detail herein. A similar set of racks 28 and trucks 29 are employed at the output end of the material-handling apparatus so as to enable removal of the processed stock from out-feed power rollers 31. The drive train means for the movable trucks is shown at 32 and 33.

Power rollers of the type employed as in-feed rollers 23 and out-feed rollers 31 are also well known in the industry. They are conventionally chain or gear driven by drive means not illustrated and are typically formed to advance bar stock, plate and other material at a rate of about 9.15 to 18.3 meters per minute (30 to 60 feet per minute), or higher if the distances are great. Power rollers have been employed in prior art material-handling systems to feed a variety of machine tools, and they are often constructed in a manner which permits variation of the speed of powered advancement of the material being conveyed. Thus, a saw operator or a pre-programmed controller, for example, as shown at 34, can and has been used to initially advance the material to be processed at relatively high speed and thereafter at a reduced or lower speed.

Prior power roller material-handling apparatus has been used in conjunction with stop means 36 mounted on the conveyor bed for engagement with the pieces of stock 24 being processed so as to stop the stock at the desired location for cutting or other machining operations. Such prior stop means 36, however, have been provided as rigid structures which are essentially impacted by the moving piece of material to terminate its travel down the powered conveyor. It should be noted that stop means 36 in prior material-handling systems is also conventionally mounted for retraction from in front of the work piece after the machining operation is completed so as permit further conveyance of the work piece away from the machine tool and to the output storage area.

Material-handling systems of the type which have heretofore employed power rollers, however, have been found to have several defects. The primary deficiency is that the moving work piece will deflect stop 36 as a result of its momentum on the conveyor, even though the speed of conveyance has been reduced. Bar stock, for example, may weigh as much as 200 to 500 kilograms per piece. A moving piece of stock, therefore, has very substantial momentum which cannot be effectively and reproducibly resisted by a so-called "rigid" stop 36.

Another problem is inherent in the power roller drive train, whether chain driven or geared. There will be considerable slack or looseness in the drive train making control of the power rollers inherently inaccurate. Thus, controller 34 may attempt to slow the bar stock as it approaches stop 26, but the velocity of impact with the stop can vary considerably. Additionally, the material on the power rollers is being frictionally conveyed. This results in the force varying with the normal force or weight of the stock and the manner in which it contacts the power rollers. Warped stock or material having surface irregularities will produce sporatically changing and unpredictable velocity profiles as the work piece moves toward the stop. Still further, upon impact with stop 36, the bar stock 24 is free to rebound and slip with respect to the rollers.

The net result has been that prior material-handling systems for production machine tools have required a relaxation of the standards for precision of the work or have required augmentation of the registration of the work piece or material with respect to the machine tool.

In the improved material-handling apparatus of the present invention stop means 36 is formed to sense the presence of material 24 at a first position 41 (best seen in FIG. 2), and the stop means is coupled to a material conveyor or power rollers 23 and 31 to terminate powered advancement of the conveyor upon sensing of the material at first position 41. As shown in FIGS. 1 and 2, stop means 36 is provided as a mechanical probe in which there are a plurality of telescoped elements, including end element 42 mounted for displacement in the direction of arrow 43 upon impact of end 35 of bar stock 24 with surface 44 of the probe. In this form of the stop means of the present invention, first position 41 is located essentially at the end surface 44 of probe element 42.

It is preferable that mechanical probe element 42 be biased against displacement, for example by spring biasing means (not shown) mounted in element 46 and formed to require the application of a predetermined force to end surface 44 before probe element 42 will be displaced rearwardly as shown by arrow 43. Such a biasing force is preferably adjustable and set at a relatively low level, for example, a 10-pound force. Once the 10-pound biasing force is exceeded by the impact of bar stock 24 on end surface 44, probe element 42 will move rearwardly and, in the preferred form, a microswitch or limit switch (not shown) in the probe will be switched, actuated or have its state changed. Thus, as soon as rearward displacement of element 42 begins at first position 41, a limit switch interposed in a control circuit or sending control signals to controller 34 is triggered and advancement of power rollers 23 and 31 is terminated, for example, by disengaging a clutch or by otherwise terminating power to the rollers.

Power rollers 23 and 31, therefore, serially advance bar stock 24 from the input racks 26 to impact with the front face 44 of the probe at a relatively high speed, for example, 9.15 to 18.3 meters per minute. This high-speed advancement greatly enhances production time and enables conveyance of relatively long pieces over significant distances for performance of machine operations thereon. Upon disengagement of the power rollers from the powered mode, they will immediately tend to slow down the work piece, although some coasting and continued advancement of bar stock 24 on the rollers after first position 41 is reached will be experienced.

A second operation is commenced upon impact of the probe of stop means 36 and closing of the first microswitch when the bar stock reaches first position 41. Material-handling apparatus 21 of the present invention further includes inching means, generally designated 51, formed to selectively engage and to brake, if necessary, and to advance material or bar stock 24 from a position proximate first position 41 to a registered position with respect to machine tool 22. When the first microswitch is switched upon impact with probe end 41, inching means 51, preferably provided as a reciprocally mounted vise, is actuated so that clamping jaws 52 and 53 clamp against work piece 24. As shown, jaw 52 is movably mounted and jaw 53 is stationary so that upon triggering of the microswitch at first position 41, jaw 52 rapidly moves across vise bed 54 and engages and clamps the work piece against jaw 53.

It is preferable that inching vise 51 be constructed so that it is capable of travelling in a first direction, which is the same as the direction of advancement of material piece 24, at a high speed comparable to the speed of the power rollers. Moreover, inching vise 51 must be capable of being slowed rapidly to a relatively low inching vise speed. Thus, when movable jaw 52 on inching vise closes toward bar 24, controller 34 can cause the inching vise to accellerate in the direction of advancement of the bar so that clamping of the bar on the fly will minimize relative motion between the vise jaws and the bar until clamping is effected and rapid and position decelleration of the bar can be started. Inching vise 51 can be provided by a reciprocally mounted vise of the type disclosed in my U.S. Pat. No. 3,504,585, with the rate of advancement or reciprocation of the vise being controlled by controlling the fluid fow to the carriage advancement motor.

Inching vise 51 is further formed to advance bar stock 24 toward stop 36 at a speed of advancement which is substantially less than the speed of advancement of the material conveyor or power rollers 23. Typically the speed of advancement of inching vise 51 is about an order of magnitude lower than the speed of advancement of the power rollers. Preferably, inching means 51 advances the bar stock at a rate of advancement of approximately 0.635 centimeters per second, making the speed of the power rollers typically between 24 and 48 times that of the inching means.

As shown in FIG. 2, a clamping position 56 is illustrated and denotes the location at which the inching vise has gripped the work piece and begins to control its advancement. Since the coasting mode of the power rollers will not normally slow the work piece to the inching vise speed within the desired distance, it is desirable to provide a second microswitch in probe means 36 which is triggered at intermediate braking or slowing position 60 to slow the advancement of the work piece by the inching vise until the relatively low inching vise speed is reached. This can also be accomplished by constructing the inching vise so that it brakes automatically upon clamping, but is preferably accomplished by providing a second microswitch in stop means 36 which is triggered at slowing position 60 and controls the inching vise so as to first brake material advancement and then continue the advancement at the inching vise speed until material end 35 reaches registered position 57.

In the material-handling apparatus shown in FIGS. 1 and 2, registered position 57 is the position at which the opposite end or a middle portion of material piece 24 is positioned precisely with respect to cutting stretch 58 of the band saw so as to enable cutting of the work piece to the predetermined desired length. Stop means 36 can be selectively positioned and locked on mounting bar 59 so as to precisely locate registered position 57 with respect to cutting stretch 58 of the saw.

During the last portion of the travel of the work piece between clamping position 56 and registered position 57, the work piece and probe are travelling at the relatively low inching vise speed. Accordingly, when registered position 57 is reached, the apparatus of the present invention is further formed so that the stop means senses the presence of the material at registered position 57 and terminates advancement of the inching vise and material. This can be accomplished by providing a third limit switch in stop means 36 which is triggered or switched at position 57 and immediately stops the inching vise.

The key to accuracy in the apparatus of the present invention is that when the inching vise advancement is terminated, the material is moving very slowly. If the advancement of inching vise 51 can be stopped in one-hundredth second and the inching vise is advancing at 0.635 centimeters per second, the material will be stopped within 0.00635 centimeters ($2\frac{1}{2}$ thousands of an inch). Moreover, unlike power rollers having longer and more complex and loose drive trains, an inching vise, which is called upon to advance the bar stock over only a very short distance, can have a very tight and precise power train, allowing registration of the work piece with respect to the machine tool at tolerances of 0.038 centimeters (15 thousandths of an inch) and below and preferably on the order of ±0.00635 centimeters (±0.0025 inches).

Displaceable stop means 36 is coupled by electrical conductors 61 to controller 34, which in turn is coupled to saw 22 through conductors 62, inching vise 51 through conductors 63 and power rollers 23 and 31 through conductors 64. It is a further important feature of the apparatus of the present invention to couple stop means 36 to the machine tool for actuation of the same. Thus, when probe element 42 is displaced to registered position 57, not only is the inching vise advancement terminated, but saw operation is actuated. In order to insure that positioning of the end 35 of the material in the registered position is not merely transitory, however, it is also preferable that controller 34 be formed so as to require a signal from stop means 36 indicating that the bar stock has actually stopped in the registered position. Thus, a delay, for example, of three seconds, during which the microswitch corresponding to registered position 57 is sensing the position of the bar end at the registered position is required before the controller actuates the saw and begins cutting of the opposite end of the bar.

Although the apparatus of the present invention is formed to precisely and accurately stop the bar at a registered position with respect to the machine tool, it is a further feature of the present invention to provide a back-up structure in the event that the bar should overshoot the registered position. This can be readily accomplished by forming stop means 36 with an additional or fourth microswitch which will be switched or actuated in the event that the probe goes beyond the registered position to a second position 66 (FIG. 2) on a side of registered position 57 opposite to the side of first position 56. If probe end 44 is displaced to second position 66, the microswitch in stop means 36 will signal controller 34, which in turn will prevent operation of saw 22 and either signal an operator or automatically reverse the direction of inching vise 51 so as to back up the material until it reaches registered position 57. Once again, saw operation will be delayed until the material has resided at the registered position for a predetermined length of time.

In practice, it has been found that the reproducibility and precision of termination of the inching vise is such that only in very rare instances will the bar end 35 travel beyond the registered position to second position 66. Accordingly, merely stopping the saw equipment and signalling an operator is sufficient for most applications. It will be equally apparent, however, to one skilled in the art, that the microswitch corresponding to second position 66 can be used to back up the inching vise until the registered position has been reached.

Referring now to FIGS. 1 and 4, the sequence of operation of the apparatus of the present invention and the steps comprising the method of the present invention can be set forth in greater detail. First, trucks 27 are elevated so as to move a piece of bar stock from input racks 26 to in-feed power rollers 23. If the bar stock, for example, is round, tilting one end of the trucks 27 will roll the stock toward vertical registration elements 71 on one side of the input rollers 23. Controller 34 is coupled to operate the sequencing of trucks 27 and in turn activates rollers 23 when the bar stock is up against the indexing upright 71. The power rollers frictionally convey bar 24 toward saw 22, which has the cutting stretch raised above the bar height on the conveyor so as to perimt the rollers to pass the bar beyond the cutting stretch until end 35 impacts stop means 36. In FIG. 4 the velocity of the bar stock as a function of distance is set forth. After an initial acceleration on the power rollers, as indicated by portion 72 of the curve, the bar stock will be travelling through the stretch area of the saw at about the maximum velocity of the power rollers, as indicated by portion 73 of the curve. The distance of the conveying bench can be virtually any size, dependent upon the size of the material to be machined.

When end 35 of bar 24 hits the end 44 of the probe and overcomes the preset force, the first limit switch turns the power rollers off, as indicated by arrow 74 at first position 41 in FIG. 4. With the power rollers disengaged, the velocity of the bar diminishes as the rollers coast and/or slide on the power rollers, as indicated by portion 76 of the curve. Simultaneously with power roller shutoff at first position 41, inching vise 51 and movable jaw 52 have started to close, and at the position indicated on the curve of FIG. 4 by arrow 77, inching vise 51 has clamped onto and positively gripped bar 24 while on the move. As the stop means probe is displaced past the clamping position of the inching vise to braking position 60, a second microswitch is actuated to brake or slow the inching vise to the inching speed, as indicated by arrow 75 and the increased slope of the curve. Thus during portion 78 of the curve of FIG. 4, the velocity of the bar is greatly decellerated while the bar is positively gripped by the inching vise until the inching vise speed has been reached. The inching vise is then steadily advanced, as indicated by portion 79 of the curve to registered position 57, at which point inching vise and bar advancement is terminated.

In a typical installation, the distance between the first position, at which the power rollers are disengaged, and the registered position, at which advancement of the inching vise is terminated, is between about 3.8 and 5 centimeters (1.5 to 2 inches). It will be understood, that it is within the scope of this invention to shorten or lengthen the distance travelled during the transition between the power roller speed and the inching vise speed, although a relatively short distance, and accordingly time interval, is important to maintaining compactness and high production rates.

In the event that bar end 35 should pass beyond registered position 57 to second position 66, as indicated by upper broken line 81, a fourth microswitch in stop means 36 will be triggered and the inching vise will be reversed, as indicated by broken line 82, until bar end 35 is positioned back at registered position 57.

FIGS. 5 and 6 show the sequence of operation graphically in which power rollers operate during the time period represented by line 83 until first position 41 is reached. Inching vise 51 is then operated, as represented by line 84 until the registered position 57 is reached, and then a time gap or delay occurs before machine tool 22 commences operation, as indicated by line 86. During the delay, the microswitch at registered position 57 in the stop means must indicate that the piece is in the registered position.

FIG. 6 illustrates the sequence when an overshoot of the registered position occurs. Again, power rollers operate, as indicated by line 87 until first position 41 is reached. Inching vise 51 then takes over, as indicated by line 88 until registered position 57 is reached, but in this case the inching vise continues to operate, as indicated by line segment 89 until second position 66 is reached. This is an overshoot position and the probe will so indicate to the controller, which then reverses the direction of the inching vise to an opposite or second low speed direction, as indicated by line portion 91 until the bar end is back at the registered position 57. A time delay again occurs before operation of machine tool 22, as indicated by line 92.

As will be seen in FIG. 1, it is preferable to provide two additional vises to inching vise 51. Mounted immediately proximate cutting stretch 58 is a stationary saw vise 101 having a movable jaw 102, which clamps against the bar immediately proximate the cutting stretch. Additionally, it is preferable to provide a second vise 103 having jaws 104 and 105 which clamp the bar stock on the upstream side of vice 101. The second vise 103 acts as an alignment vise and preferably is formed in accordance with my U.S. Pat. No. 3,504,585 so that the two jaws 104 and 105 clamp against the piece, but are free to float in a lateral direction so as to provide a self centering feature. It is also preferable that inching vise 51 be formed with laterally displaceable jaws so as to be self-centering. This lateral floating or displacement of the jaws of vises 51 and 103 while clamped allows the vises to rigidify and hold the bar firmly even though the bar may be warped or slightly bent.

As will be appreciated, both vises 101 and 103 will be actuated after the delay at the registered position indicates that the bar end is truly registered and before cutting of the bar begins. As will also be appreciated, the length of the bar to be cut may cause either or both of vises 101 and 103 to fail to engage the bar. If end 45 of the bar extends upstream of the cutting stretch by a short distance, only vise 101 will engage the upstream portion of the bar. If end 45 is essentially positioned at the cutting stretch and a crop cut or facing cut is to be made, even vise 101 may not grip bar end 45.

After the cut is made, the cutting stretch is raised to a position above the bar, all three vises are opened, probe 36 is swung out of engagement with the bar, out-feed or discharge power rollers 31 are actuated to move the bar to the output trucks 29, and the output trucks are used to move the bar to output racks or holding stations 28. As the bar is moved to the output holding station, a new bar can be fed onto in-feed power rollers 23 and the sequence repeated.

In an alternative embodiment of the material-handling apparatus of the present invention, as shown by FIG. 3, stop means 36a is formed as a laser mounted proximate power rollers 31a. Eminating from laser 36a is a beam 110 which extends down the conveyor bed perpendicular to rollers 31a. Laser beam 36a further includes a receiver 111 formed to sense reflection of beam 110 off of the piece of material being advanced on the power rollers. As the end of the material advances, receiver 111 senses the same and is coupled to computer controller 112 by electrical connections 113. As was the case for controller 34, computer 112 is electrically connected to the power rollers, inching vise and machine tool so as to effect sequencing of the same as above described. As the end of the bar moves toward laser 36a, beam 110 is reflected and receiver 111 will measure the position and velocity of the bar, as is well known in the art, and cause disengagement of power rollers 31a, clamping of the inching vise, slowing down of the inching vise and termination of the inching vise when the registered position is reached. Similarly, the beam reflection can be used to determine that the bar has been stopped beyond the registered position, and the computer controller used to reverse the inching vise and back the bar up to the registered position. As will be appreciated, a general purpose digital computer can be employed as controller 112 and/or an analogue computer may be used to control sequencing based upon sensing information received from laser stop means 36a.

A laser stop means, when coupled to a computer, is capable of extremely precise positioning of the bar in a registered position using the method of the present invention. Moreover, one need not retract the laser, and it is readily adapted for use on the upstream side of the saw, as well as the downstream side. A similar result can be obtained by employing other forms of beam generating apparatus as stop means to sense the presence of the bar in the first position and the registered position. Photoelectric cells, for example, can be employed, as can sound-wave based systems.

The material-handling apparatus of the present invention has been found to operate with a high degree of reproducibility and accuracy. Gripping of the bar, as opposed to allowing the same to be frictionally conveyed, produces precise control of the bar placement. Moreover, the combination of an inching means with the high-speed conveyor allows much greater control and precision by avoiding the inherent drive train slack in high-speed conveyors. Still further, the use of a vise to grip the bar eliminates variations which can occur as a result of differences in the mass of the material being conveyed.

The material-handling apparatus of the present invention can be used with conventional bar feeding tables, such as is disclosed in my prior U.S. Pat. No. 3,504,585, which would be placed between vises 101 and 103. Such tables per se are adequate for automatic feeding of relatively short bar stock, but they tend to operate at relatively low speeds and are not well suited for production handling of long stock. Similarly, a variety of input and output holding stations and loading trucks can and have been employed with power rollers. Accordingly, the apparatus and method of the present invention is well suited for a wide variety of installations, including retrofitting to existing systems which have power rollers.

What is claimed is:

1. A material-handling apparatus for rapid and precision feeding of material, such as bar stock, plate stock and the like, into a predetermined registered position with respect to a machine tool, said material-handling apparatus including material conveyor means formed for support of said material thereon and formed for powered advancement of said material at a relatively high speed toward said registered position, stop means formed and positioned to terminate high speed powered advancement of said material in advance of said registered postion, and low speed advancement means formed to advance said material toward said registered position at a relatively low speed, said stop means being further formed to terminate the low speed advancement of said material at approximately said registered position, wherein the improvement in said material-handling apparatus is comprised of:

said low speed advancement means is provided by movable inching vise means formed to selectively positively grip and to advance said material while gripped from a position in advance of and proximate said registered position toward said registered position at said low speed; and said stop means being further formed and coupled to sense the presence of said material at said registered position and to terminate advancement of said material by said inching vise means upon sensing thereof in said registered position.

2. The material-handling apparatus as defined in claim 1 wherein, said material conveyor means is provided by power roller means formed for operation in a powered advancement mode and an unpowered coasting mode; and said stop means is formed and coupled to substantially simultaneously terminate powered advancement of said material conveyor means and commence closing of said inching vise means for gripping of said material while advancing in said coasting mode on said power roller means.

3. The material-handling apparatus as defined in claim 1 wherein, said stop means is formed to sense the presence of said material at an intermediate braking position in advance of said registered position and is coupled to said inching vise means to cause said inching vise means to brake the speed of advancement of said material until the inching speed is reached.

4. The material-handling apparatus as defined in claim 1 wherein, said stop means is formed as displaceable probe means formed to engage said material when said material is advance to a first position in advance of said registered position and is formed for displacement of said probe means while engaging said material during movement of said material between said first position and said registered position;

said stop means is coupled to a control circuit extending between said stop means and said material conveyor means and said stop means and said inching vise means; and said stop means further include said switch means interposed in said circuit and responsive to displacement of said probe means and formed to effect termination of powered advancement of said material conveyor means, actuation of said inching vise means and termination of advancement of said inching vise means.

5. The material-handling apparatus as defined in claim 4 wherein, said probe means is further formed and mounted for displacement while engaging said material from said registered position to a second position on a side of said registered position opposite said first position.

6. The material-handling apparatus as defined in claim 5 wherein, said control circuit is further coupled to said machine tool; and said switch means is interposed in said control circuit and formed to prevent operation of said machine tool upon displacement of said probe means by said material to said second position.

7. The material-handling apparatus as defined in claim 1 wherein, said stop means is provided as a lazer formed to generate a beam across the path of advancement of said material, said lazer being further coupled to a control circuit connected to said material conveyor means and said inching vise means for transmission of control signals thereto upon positioning of said material in said position in advance of said registered position and in said registered position.

8. The material-handling apparatus as defined in claims 1 wherein, said inching vise means is formed for advancement of said material while positively gripped by said inching vise means toward said registered position at a variable rate of speed; and computer means coupled to said stop means and formed to determine from input from said stop means the rate of advancement of said material during advancement between said position in advance of said registered position and said registered position and coupled to said inching vise means and formed to vary the rate of advancement of said inching vise means based upon determination of the rate of advancement to produce precise stopping at said registered position.

9. The material-handling apparatus as defined in claim 1 wherein, said stop means includes sensing means, a control circuit, four switches interposed in said circuit and coupled for actuation by said sensing means, a first of said switches being positioned in said circuit and coupled to said sensing means to terminate powered advancement of said material conveying means and simultaneously to actuate said inching vise means upon sensing of said material in a first position in advance of said registered position, a second of said switches being positioned in said circuit and being coupled to said sensing means to cause braking and slow advancement of said inching vise means upon sensing of said material in an intermediate braking position between said first position and said registered position, a third of said switches beig positioned in said circuit and being coupled to said sensing means to terminate advancement of said inching vise means upon sensing of said material in said registered position, and a fourth of said switches being positioned in said circuit and coupled to said sensing means to terminate operation of said machine tool upon sensing of said material in a position opposite to said first position.

10. The material-handling apparatus as defined in claim 1 wherein, said stop means includes a mechanical probe formed and positioned to engage said material to effect sensing of the presence thereof at a first position in advance of said registered position, said probe being further movably mounted for selective movement between a sensing position for engagement with said material and a retracted position permitting passage of said material therebeyond after machining of said material.

11. The material-handling apparatus as defined in claim 10 wherein, said probe is movably mounted for selective adjustment of the location of said first position, said probe is formed to require a predetermined force of engagement by said material before sensing the presence of said material at said first position and is formed for adjustment of said predetermined force.

12. The material-handling apparatus as defined in claim 11 wherein, said probe is mounted on a side of said machine tool opposite to the side from which said material is being advanced.

13. The material-handling apparatus as defined in claim 1 wherein, said stop means is formed to sense the presence of said material at said registered position and is formed to actuate operation of said machine tool upon sensing of the presence of said material at said registered position after a predetermined length of time.

14. A material-handling method for serially feeding pieces of material into a registered position with respect to a machine tool for performance of a machining operation thereon, said method including the steps of advancing a piece of material toward said registered position at a relatively high speed on powered conveyor means, terminating powered driving of said conveyor means, commencing relatively low speed advancing of said piece of material, and stopping said piece of material at approximately said registered position by terminating said low speed advancing step, wherein the improvement in said material-handling method is comprised of the steps of:

commencing said relatively low speed advancing step by positively gripping said piece of material in inching vise means and advancing said inching vise means at said low speed; and during said stopping step, terminating said low speed advancement of said inching vise means to stop said piece of material precisely at said registered position.

15. The material-handling method as defined in claim 14 wherein, said high speed advancing step is accomplished by conveying said piece of material on power rollers;

said terminating of said high speed advancing step and said commencing of relatively low speed advancing are accomplished by sensing the position of said piece of material proximate and in advance of said registered position, gripping said piece of material by said inching vise means in advance of said registered position, braking the speed of advancement of said piece of material, and advancing said inching vise means at a relatively low speed to said registered position.

16. A material-handling method as defined in claim 15 wherein, said gripping step is accomplished while said piece of material is advancing on said power rollers.

* * * * *